(12) United States Patent
Thai et al.

(10) Patent No.: US 11,502,293 B2
(45) Date of Patent: Nov. 15, 2022

(54) METHOD AND SYSTEM FOR COPPER COATED ANODE ACTIVE MATERIAL

(71) Applicant: Enevate Corporation, Irvine, CA (US)

(72) Inventors: Mya Le Thai, Fountain Valley, CA (US); Benjamin Park, Mission Viejo, CA (US); Heidi Anderson, Huntington Beach, CA (US)

(73) Assignee: ENEVATE CORPORATION, Irvine, CA (US)

( * ) Notice: Subject to any disclaimer, the term of this patent is extended or adjusted under 35 U.S.C. 154(b) by 0 days.

(21) Appl. No.: 17/204,856

(22) Filed: Mar. 17, 2021

(65) Prior Publication Data
US 2022/0302439 A1    Sep. 22, 2022

(51) Int. Cl.
| | |
|---|---|
| *H01M 4/583* | (2010.01) |
| *H01M 4/36* | (2006.01) |
| *H01M 4/38* | (2006.01) |
| *H01M 10/0525* | (2010.01) |
| *H01M 4/66* | (2006.01) |
| *H01M 4/04* | (2006.01) |

(52) U.S. Cl.
CPC ......... *H01M 4/366* (2013.01); *H01M 4/0404* (2013.01); *H01M 4/386* (2013.01); *H01M 4/583* (2013.01); *H01M 4/661* (2013.01); *H01M 10/0525* (2013.01)

(58) Field of Classification Search
None
See application file for complete search history.

(56) References Cited

U.S. PATENT DOCUMENTS

2013/0101897 A1*  4/2013  Fukui ............... H01M 4/622
                                                                  429/211

* cited by examiner

*Primary Examiner* — Zhongqing Wei
(74) *Attorney, Agent, or Firm* — McAndrews, Held & Malloy, Ltd.

(57) ABSTRACT

A method and system for copper coated anode active material may include providing a metal current collector; an active material layer on the current collector, the active material layer comprising at least 50% silicon by weight, a pyrolyzed carbon source; and a layer of metal on the active material layer that increases conductivity of the layer. The surface may be opposite to a surface of the active material layer that is coupled to the current collector. The layer of metal may comprise copper. The silicon may comprise particles ranging in size from 2 to 50 µm. The metal layer may comprise islands of metal on the silicon particles. The islands of metal may have a thickness of 100 nm or less. The islands of metal may be less than 50 µm across. A conductivity of the anode active material layer and layer of metal may be less than $2 \times 10^{-5}$ Ω-cm.

22 Claims, 9 Drawing Sheets

METHOD AND SYSTEM FOR COPPER COATED ANODE ACTIVE MATERIAL

CROSS-REFERENCE TO RELATED APPLICATIONS/INCORPORATION BY REFERENCE

N/A

FIELD

Aspects of the present disclosure relate to energy generation and storage. More specifically, certain embodiments of the disclosure relate to a method and system for copper coated anode active material.

BACKGROUND

Conventional approaches for forming an anode may be costly, cumbersome, and/or inefficient—e.g., they may be complex and/or time consuming to implement, and may limit battery lifetime.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and/or method for copper coated anode active material, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Figure 1:
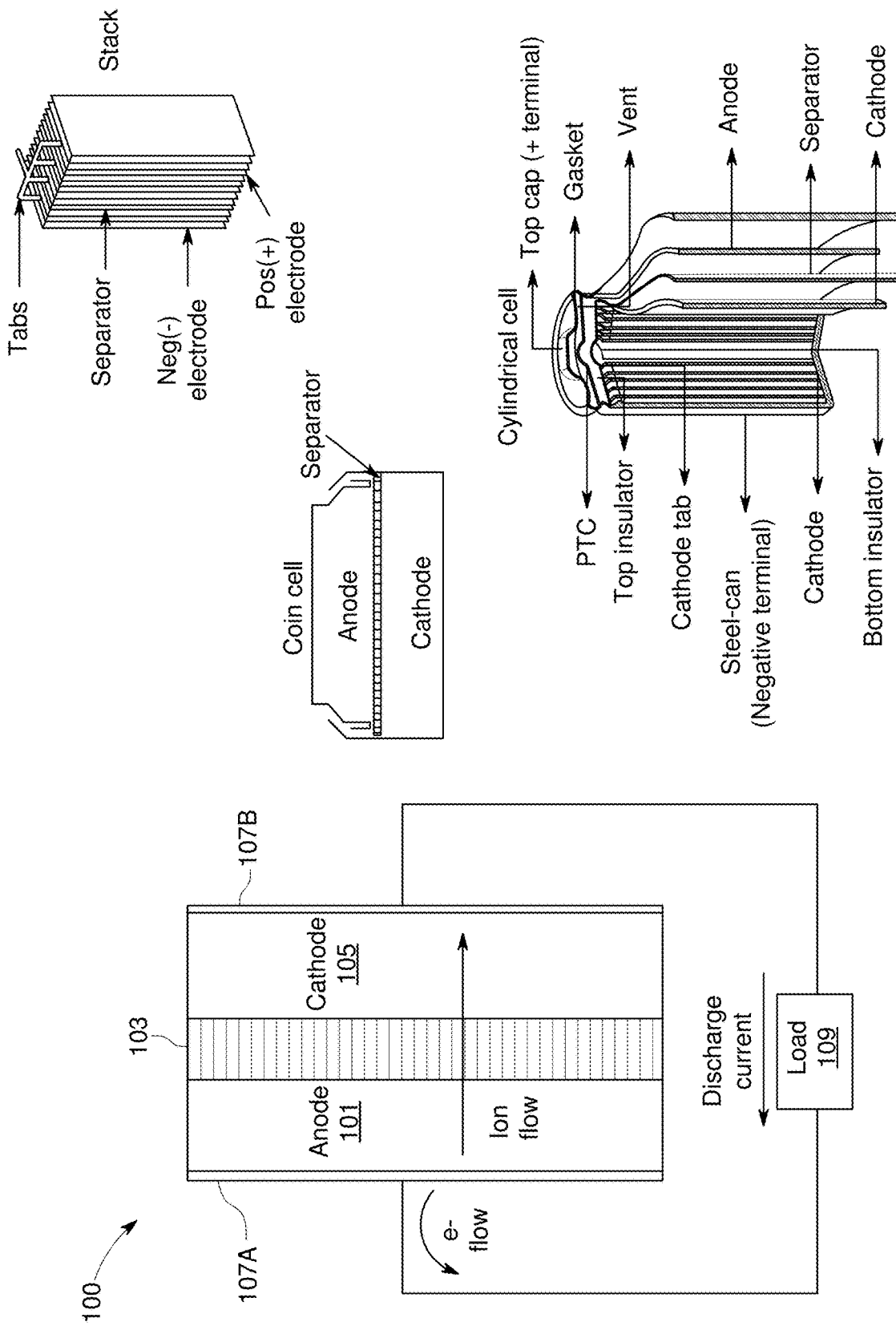
FIG. 1 is a diagram of a battery, in accordance with an example embodiment of the disclosure.

FIG. 1 is a diagram of a battery with silicon-dominant anodes, in accordance with an example embodiment of the disclosure. Referring to FIG. 1, there is shown a battery 100 comprising a separator 103 sandwiched between an anode 101 and a cathode 105, with current collectors 107A and 107B. There is also shown a load 109 coupled to the battery 100 illustrating instances when the battery 100 is in discharge mode. In this disclosure, the term "battery" may be used to indicate a single electrochemical cell, a plurality of electrochemical cells formed into a module, and/or a plurality of modules formed into a pack. Furthermore, the battery 100 shown in FIG. 1 is a very simplified example merely to show the principle of operation of a lithium ion cell. Examples of realistic structures are shown to the right in FIG. 1, where stacks of electrodes and separators are utilized, with electrode coatings typically on both sides of the current collectors. The stacks may be formed into different shapes, such as a coin cell, cylindrical cell, or prismatic cell, for example.

The development of portable electronic devices and electrification of transportation drive the need for high performance electrochemical energy storage. Small-scale (<100 Wh) to large-scale (>10 KWh) devices primarily use lithium-ion (Li-ion) batteries over other rechargeable battery chemistries due to their high-performance.

The anode 101 and cathode 105, along with the current collectors 107A and 107B, may comprise the electrodes, which may comprise plates or films within, or containing, an electrolyte material, where the plates may provide a physical barrier for containing the electrolyte as well as a conductive contact to external structures. In other embodiments, the anode/cathode plates are immersed in electrolyte while an outer casing provides electrolyte containment. The anode 101 and cathode are electrically coupled to the current collectors 107A and 107B, which comprise metal or other conductive material for providing electrical contact to the electrodes as well as physical support for the active material in forming electrodes.

The configuration shown in FIG. 1 illustrates the battery 100 in discharge mode, whereas in a charging configuration, the load 109 may be replaced with a charger to reverse the process. In one class of batteries, the separator 103 is generally a film material, made of an electrically insulating polymer, for example, that prevents electrons from flowing from anode 101 to cathode 105, or vice versa, while being porous enough to allow ions to pass through the separator 103. Typically, the separator 103, cathode 105, and anode 101 materials are individually formed into sheets, films, or active material coated foils. Sheets of the cathode, separator and anode are subsequently stacked or rolled with the separator 103 separating the cathode 105 and anode 101 to form the battery 100. In some embodiments, the separator 103 is a sheet and generally utilizes winding methods and stacking in its manufacture. In these methods, the anodes, cathodes, and current collectors (e.g., electrodes) may comprise films.

In an example scenario, the battery 100 may comprise a solid, liquid, or gel electrolyte. The separator 103 preferably does not dissolve in typical battery electrolytes such as compositions that may comprise: Ethylene Carbonate (EC), Fluoroethylene Carbonate (FEC), Propylene Carbonate (PC), Dimethyl Carbonate (DMC), Ethyl Methyl Carbonate (EMC), Diethyl Carbonate (DEC), etc. with dissolved $LiBF_4$, $LiAsF_6$, $LiPF_6$, and $LiClO_4$ etc. In an example scenario, the electrolyte may comprise Lithium hexafluorophosphate ($LiPF_6$) and lithium bis(trifluoromethanesulfonyl)imide (LiTFSI) that may be used together in a variety of electrolyte solvents. Lithium hexafluorophosphate ($LiPF_6$) may be present at a concentration of about 0.1 to 2.0 molar (M) and lithium bis(trifluoromethanesulfonyl)imide (LiTFSI) may be present at a concentration of about 0 to 2.0 molar (M). Solvents may comprise one or more of ethylene carbonate (EC), fluoroethylene carbonate (FEC) and/or ethyl methyl carbonate (EMC) in various percentages. In some embodiments, the electrolyte solvents may comprise one or more of EC from about 0-40%, FEC from about 2-40% and/or EMC from about 50-70%

The separator 103 may be wet or soaked with a liquid or gel electrolyte. In addition, in an example embodiment, the separator 103 does not melt below about 100 to 120° C., and exhibits sufficient mechanical properties for battery applications. A battery, in operation, can experience expansion and contraction of the anode and/or the cathode. In an example embodiment, the separator 103 can expand and contract by at least about 5 to 10% without failing, and may also be flexible.

The separator 103 may be sufficiently porous so that ions can pass through the separator once wet with, for example, a liquid or gel electrolyte. Alternatively (or additionally), the separator may absorb the electrolyte through a gelling or other process even without significant porosity. The porosity of the separator 103 is also generally not conductive enough to allow the anode 101 and cathode 105 to transfer electrons through the separator 103.

The anode 101 and cathode 105 comprise electrodes for the battery 100, providing electrical connections to the device for transfer of electrical charge in charge and discharge states. The anode 101 may comprise silicon, carbon, or combinations of these materials, for example. Typical anode electrodes comprise a carbon material that includes a current collector such as a copper sheet. Carbon is often used because it has excellent electrochemical properties and is also electrically conductive. Anode electrodes currently used in rechargeable lithium-ion cells typically have a specific capacity of approximately 200 milliamp hours per gram. Graphite, the active material used in most lithium ion battery anodes, has a theoretical energy density of 372 milliamp hours per gram (mAh/g). In comparison, silicon has a high theoretical capacity of 4200 mAh/g. In order to increase volumetric and gravimetric energy density of lithium-ion batteries, silicon may be used as the active material for the cathode or anode. Silicon anodes may be formed from silicon composites, with more than 50% silicon or more by weight in the anode material on the current collector, for example.

In an example scenario, the anode 101 and cathode 105 store the ion used for separation of charge, such as lithium. In this example, the electrolyte carries positively charged lithium ions from the anode 101 to the cathode 105 in discharge mode, as shown in FIG. 1 for example, and vice versa through the separator 105 in charge mode. The movement of the lithium ions creates free electrons in the anode 101 which creates a charge at the positive current collector 107B. The electrical current then flows from the current collector through the load 109 to the negative current collector 107A. The separator 103 blocks the flow of electrons inside the battery 100, allows the flow of lithium ions, and prevents direct contact between the electrodes.

While the battery 100 is discharging and providing an electric current, the anode 101 releases lithium ions to the cathode 105 via the separator 103, generating a flow of electrons from one side to the other via the coupled load 109. When the battery is being charged, the opposite happens where lithium ions are released by the cathode 105 and received by the anode 101.

The materials selected for the anode 101 and cathode 105 are important for the reliability and energy density possible for the battery 100. The energy, power, cost, and safety of current Li-ion batteries need to be improved in order to, for example, compete with internal combustion engine (ICE) technology and allow for the widespread adoption of electric vehicles (EVs). High energy density, high power density, and improved safety of lithium-ion batteries are achieved with the development of high-capacity and high-voltage cathodes, high-capacity anodes and functionally non-flammable electrolytes with high voltage stability and interfacial compatibility with electrodes. In addition, materials with low toxicity are beneficial as battery materials to reduce process cost and promote consumer safety.

The performance of electrochemical electrodes, while dependent on many factors, is largely dependent on the robustness of electrical contact between electrode particles, as well as between the current collector and the electrode particles. The electrical conductivity of silicon anode electrodes may be manipulated by incorporating conductive additives with different morphological properties. Carbon black (SuperP), vapor grown carbon fibers (VGCF), and a mixture of the two have previously been incorporated separately into the anode electrode resulting in improved performance of the anode. The synergistic interactions between the two carbon materials may facilitate electrical contact throughout the large volume changes of the silicon anode during charge and discharge.

State-of-the-art lithium-ion batteries typically employ a graphite-dominant anode as an intercalation material for lithium. Silicon-dominant anodes, however, offer improvements compared to graphite-dominant Li-ion batteries. Silicon exhibits both higher gravimetric (4200 mAh/g vs. 372 mAh/g for graphite) and volumetric capacities (2194 mAh/L vs. 890 mAh/L for graphite). In addition, silicon-based anodes have a low lithiation/delithiation voltage plateau at about 0.3-0.4V vs. Li/Li+, which allows it to maintain an open circuit potential that avoids undesirable Li plating and dendrite formation. While silicon shows excellent electrochemical activity, achieving a stable cycle life for silicon-based anodes is challenging due to silicon's large volume changes during lithiation and delithiation. Silicon regions may lose electrical contact from the anode as large volume changes coupled with its low electrical conductivity separate the silicon from surrounding materials in the anode.

In addition, the large silicon volume changes exacerbate solid electrolyte interphase (SEI) formation, which can further lead to electrical isolation and, thus, capacity loss. Expansion and shrinkage of silicon particles upon charge-discharge cycling causes pulverization of silicon particles, which increases their specific surface area. As the silicon surface area changes and increases during cycling, SEI repeatedly breaks apart and reforms. The SEI thus continually builds up around the pulverizing silicon regions during cycling into a thick electronic and ionic insulating layer. This accumulating SEI increases the impedance of the electrode and reduces the electrode electrochemical reactivity, which is detrimental to cycle life.

In this disclosure, the increased impedance seen in silicon-dominant anodes due to expansion and contraction during cycling may be compensated by adding a thin metal layer on the surface of the anode active material layer opposite to the current collector. Example materials are copper and nickel, although other materials are possible providing they can withstand pyrolysis temperatures, if applied before pyrolysis. Other metals that are stable on the anode may be used such as stainless steel, tungsten, gold, silver, or platinum. The thickness of the metal layer may be much thinner than the active material layer and the current collector. This is shown further with respect to FIGS. 2-7.

Figure 2A:
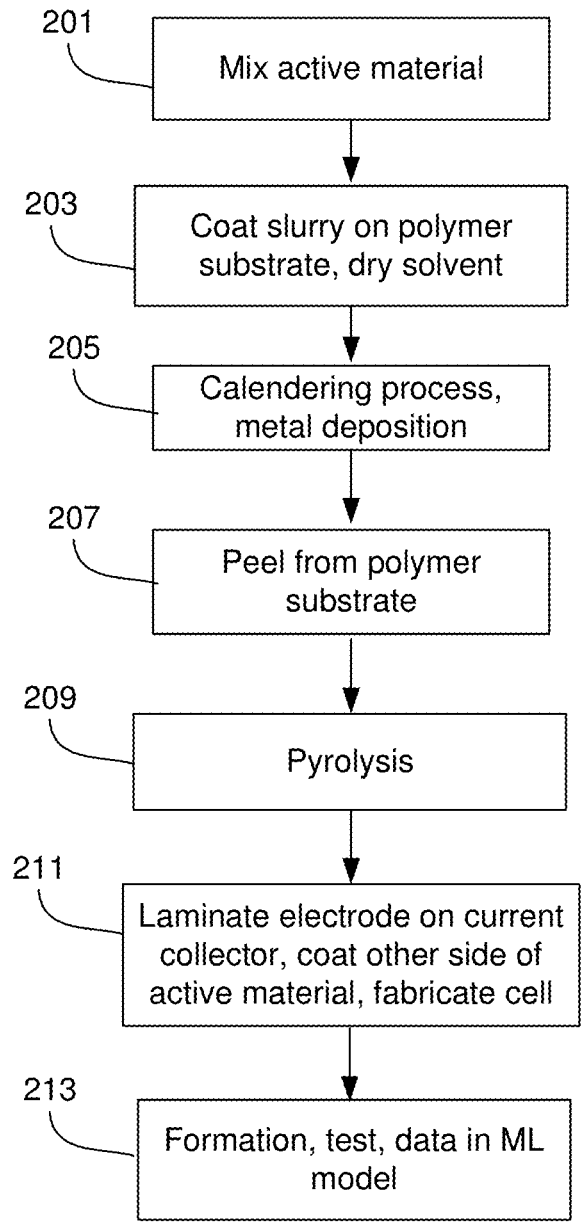
FIG. 2A is a flow diagram of a lamination process for forming a silicon-dominant anode cell, in accordance with an example embodiment of the disclosure.

FIG. 2A is a flow diagram of a lamination process for forming a silicon-dominant anode cell, in accordance with an example embodiment of the disclosure. This process employs a high-temperature pyrolysis process on a substrate, layer removal, and a lamination process to adhere the active material layer to a current collector.

The raw electrode active material is mixed in step 201. In the mixing process, the active material may be mixed, e.g., a binder/resin (such as polyimide (PI), polyamide-imide (PAI)), solvent, and conductive additives. The materials may comprise carbon nanotubes/fibers, graphene sheets, metal polymers, metals, semiconductors, and/or metal oxides, for example. Silicon powder with a 1-30 or 5-30 µm particle size, for example, may then be dispersed in polyamic acid resin (15% solids in N-Methyl pyrrolidone (NMP)) at, e.g., 1000 rpm for, e.g., 10 minutes, and then the conjugated carbon/NMP slurry may be added and dispersed at, e.g., 2000 rpm for, e.g., 10 minutes to achieve a slurry viscosity within 2000-4000 cP and a total solid content of about 30%.

In step 203, the slurry may be coated on a substrate. In this step, the slurry may be coated onto a Polyester, polyethylene terephthalate (PET), or Mylar film at a loading of, e.g., 2-4 mg/cm$^2$ and then undergo drying to an anode coupon with high Si content and less than 15% residual solvent content. This may be followed by an optional calendering process in step 205, where a series of hard pressure rollers may be used to finish the film/substrate into a smoothed and denser sheet of material. In addition, a metal layer may be deposited on a surface of the dried film opposite to the side on which the current collector is later coupled. In another example scenario, the added metal layer may be deposited after removal from the substrate in step 207. The metal layer may be deposited using physical vapor deposition, chemical vapor deposition, or by applying a thin foil.

In step 207, the green film may then be removed from the PET, where the active material may be peeled off the polymer substrate, the peeling process being optional for a polypropylene (PP) substrate, since PP can leave ~2% char residue upon pyrolysis. The peeling may be followed by a pyrolysis step 209 where the material may be heated to 600-1250 C for 1-3 hours, cut into sheets, and vacuum dried using a two-stage process (120° C. for 15 h, 220° C. for 5 h).

In step 211, the electrode material may be laminated on a current collector. For example, a 5-20 µm thick copper foil may be coated with polyamide-imide with a nominal loading of, e.g., 0.2-0.6 mg/cm$^2$ (applied as a 6 wt % varnish in NMP and dried for, e.g., 12-18 hours at, e.g., 110° C. under vacuum). The anode coupon may then be laminated on this adhesive-coated current collector. In an example scenario, the silicon-carbon composite film is laminated to the coated copper using a heated hydraulic press. An example lamination press process comprises 30-70 seconds at 300° C. and 3000-5000 psi, thereby forming the finished silicon-composite electrode.

In step 213, the cell may be assessed before being subject to a formation process. The measurements may comprise impedance values, open circuit voltage, and thickness measurements. During formation, the initial lithiation of the anode may be performed, followed by delithiation. Cells may be clamped during formation and/or early cycling. The formation cycles are defined as any type of charge/discharge of the cell that is performed to prepare the cell for general cycling and is considered part of the cell production process. Different rates of charge and discharge may be utilized in formation steps.

Figure 2B:
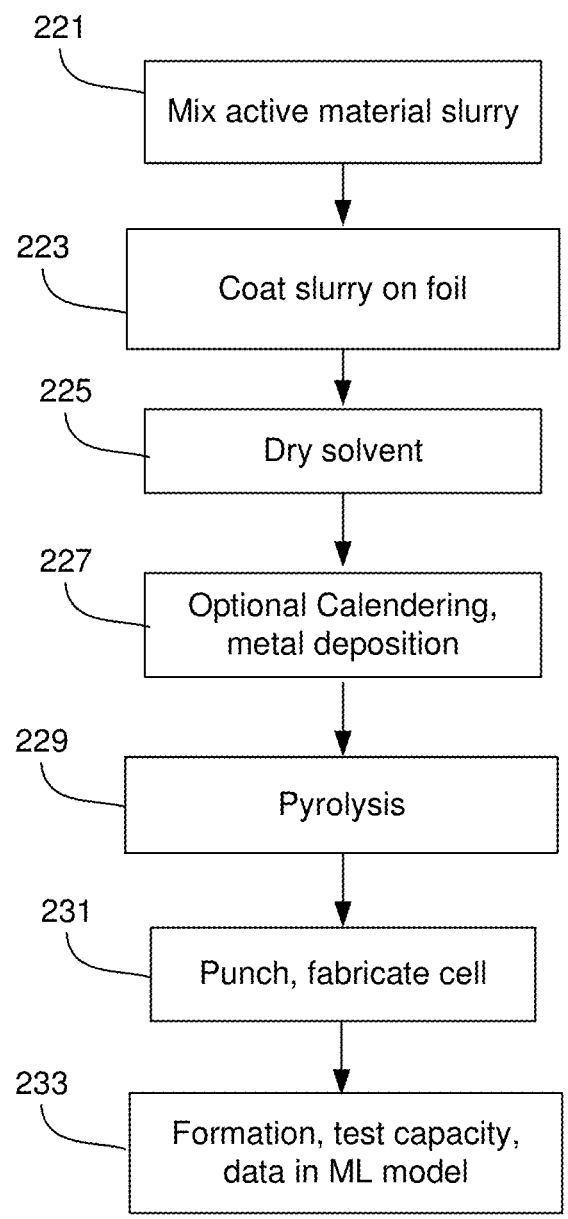
FIG. 2B is a flow diagram of a direct coating process for forming a silicon-dominant anode cell, in accordance with an example embodiment of the disclosure.

FIG. 2B is a flow diagram of a direct coating process for forming a silicon-dominant anode cell, in accordance with an example embodiment of the disclosure. This process comprises physically mixing the active material, conductive additive, and binder together, and coating it directly on a current collector before pyrolysis. This example process comprises a direct coating process in which an anode or cathode slurry is directly coated on a copper foil using a binder such as CMC, SBR, Sodium Alginate, PAI, PI and mixtures and combinations thereof.

In step 221, the active material may be mixed, e.g., a binder/resin (such as PI, PAI), solvent, and conductive additives. The materials may comprise carbon nanotubes/fibers, graphene sheets, metal polymers, metals, semiconductors, and/or metal oxides, for example. Silicon powder with a 5-30 µm particle size, for example, may then be dispersed in polyamic acid resin (15% solids in N-Methyl pyrrolidone (NMP)) at, e.g., 1000 rpm for, e.g., 10 minutes, and then the conjugated carbon/NMP slurry may be added and dispersed at, e.g., 2000 rpm for, e.g., 10 minutes to achieve a slurry viscosity within 2000-4000 cP and a total solid content of about 30%.

Furthermore, cathode active materials may be mixed in step 221, where the active material may comprise lithium cobalt oxide (LCO), lithium iron phosphate, lithium nickel cobalt manganese oxide (NMC), lithium nickel cobalt aluminum oxide (NCA), lithium manganese oxide (LMO), lithium nickel manganese spinel, or similar materials or combinations thereof, mixed with a binder as described above for the anode active material.

In step 223, the slurry may be coated on a copper foil. In the direct coating process described here, an anode slurry is coated on a current collector with residual solvent followed by a calendaring process for densification followed by pyrolysis (~500-800 C) such that carbon precursors are partially or completely converted into glassy carbon. Similarly, cathode active materials may be coated on a foil material, such as aluminum, for example. The active material layer may undergo a drying in step 225 resulting in reduced residual solvent content. An optional calendering process may be utilized in step 227 where a series of hard pressure rollers may be used to finish the film/substrate into a smoother and denser sheet of material. In addition, a metal layer may be deposited on a surface of the dried film opposite to the side on which the current collector is later coupled. The metal layer may be deposited using physical vapor deposition, chemical vapor deposition, or by applying a thin foil, for example.

In step 229, the active material may be pyrolyzed by heating to 500-1000° C. such that carbon precursors are partially or completely converted into glassy carbon. Pyrolysis can be done either in roll form or after punching. If done in roll form, the punching is done after the pyrolysis process. The pyrolysis step may result in an anode active material having silicon content greater than or equal to 50% by weight, where the anode has been subjected to heating at or above 400 degrees Celsius. In an example scenario, the anode active material layer may comprise 20 to 95% silicon and in yet another example scenario may comprise 50 to 95% silicon by weight. In instances where the current collector foil is not pre-punched/pre-perforated, the formed electrode may be perforated with a punching roller, for example. The punched electrodes may then be sandwiched with a separator and electrolyte to form a cell.

In step 233, the cell may be assessed before being subject to a formation process. The measurements may comprise impedance values, open circuit voltage, and thickness measurements. During formation, the initial lithiation of the anode may be performed, followed by delithiation. Cells may be clamped during formation and/or early cycling. The formation cycles are defined as any type of charge/discharge of the cell that is performed to prepare the cell for general cycling and is considered part of the cell production process. Different rates of charge and discharge may be utilized in formation steps.

Figure 3:
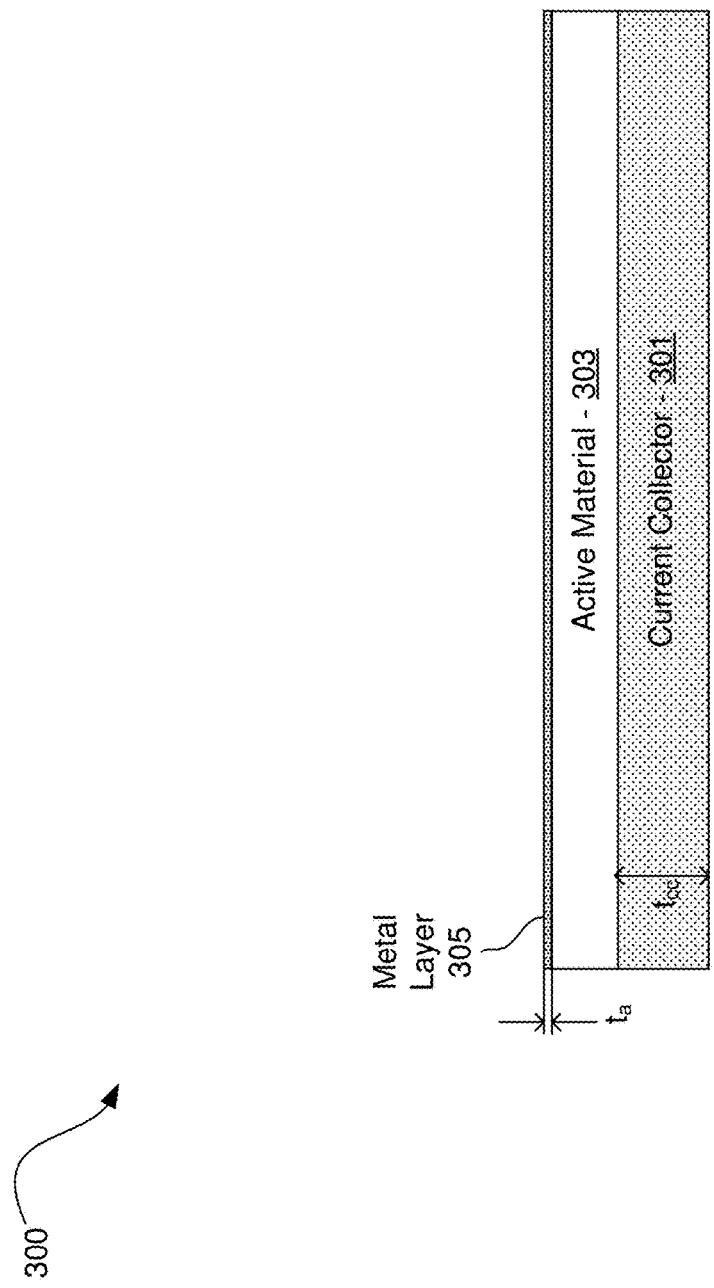
FIG. 3 illustrates an anode with copper coating, in accordance with an example embodiment of the disclosure.

FIG. 3 illustrates a metal layer coated anode, in accordance with an example embodiment of the disclosure. Referring to FIG. 3, there is shown anode 300 comprising current collector 301, and active material layer 303, and a metal layer 305. The current collector 301 may comprise copper or other suitable metal for current collection in the electrode and providing electrical contact to an outside terminal, such as a tab as shown in FIG. 1. The thickness of the current collector 301 may range from about 5 microns up to tens of microns.

The active material layer 303 may comprise pyrolyzed binder, silicon, and conductive additives, as described above. The metal layer 305 may comprise a metallic layer that is deposited on the active material layer 303 prior to pyrolysis of the anode 300. The metal may comprise copper or nickel, for example, or any metal that will not adversely react with components of the active material layer 303. Other metals that are stable on the anode may be used such as stainless steel, tungsten, gold, silver, or platinum. During pyrolysis, the deposited metal may alloy with the active material, with possible reactions between carbon and copper as well as between carbon and silicon. Due to the high heat during pyrolysis, the metal layer may change from a smooth continuous layer to islands of material scattered across the surface on the silicon particles, but may still be electrically coupled by filaments of metal.

The metal layer 305 comprises a higher conductivity layer than the active material layer 303, particularly compared to the active material layer 303 after multiple cycles that may cause pulverization of the silicon/pyrolyzed binder. The added metal layer 305 therefore provides a parallel conduction path for electron flow during charging and discharging, and also may provide improved thermal conductivity of the anode, improving battery safety.

The thickness to of the metal layer 305 may be on the order of several to tens of nanometers, or even 100-200 nm, before pyrolysis and may extend into the active material layer 305 following pyrolysis due to the roughness of the active material layer 303 and also due to alloying with materials in the active material layer 303. In addition the metal layer 305 may comprise a thin coating on individual silicon particles, resembling "islands" of metal on the silicon particles. The size of the silicon particles may range from a few microns across to tens of microns across, such as from 1-10, μm, 1-20 μm, 2-30 μm, 2-50 μm, and 2-50 μm, for example. In some cases, the copper acts as a connective conductive web that can act as an electrical contact to several silicon particles or phases of the active material layer, where the phases may comprise local regions of silicon and pyrolyzed carbon. The advantages of the metal layer 305 comprise better electrode conductivity, better thermal conductivity, higher initial coulombic efficiency, and improved cycle capacity.

Figure 6:
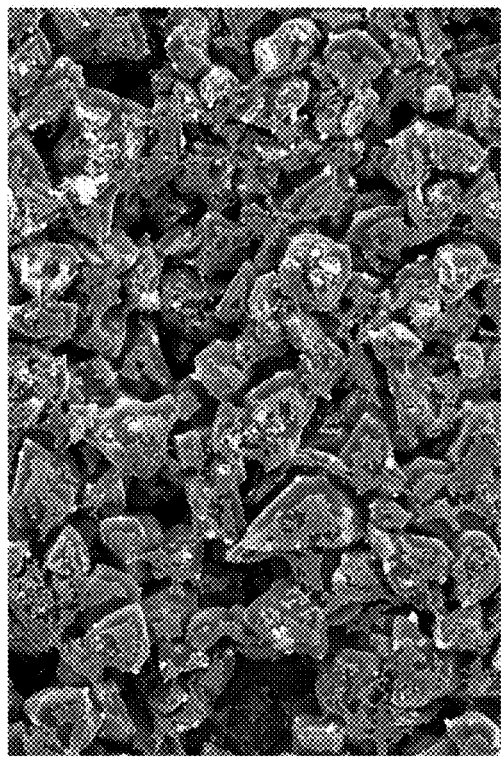
FIG. 6 shows scanning electron microscope images of copper-coated silicon-dominant anodes, in accordance with an example embodiment of the disclosure.
Figure 6:
Figure 6:
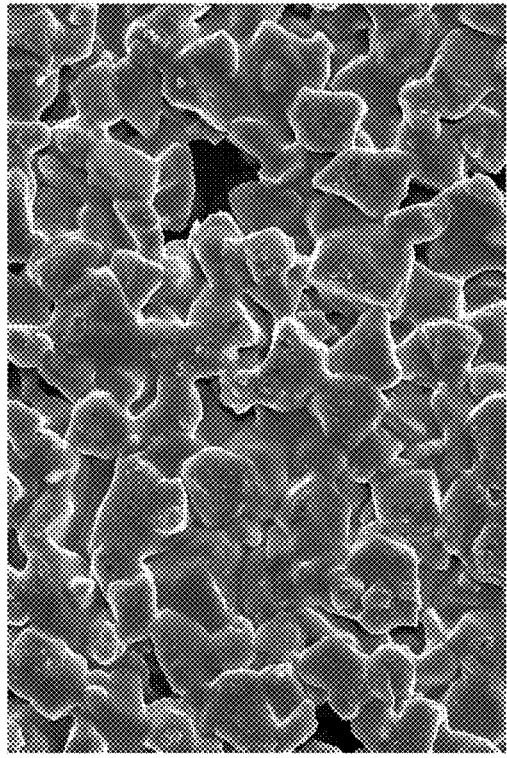
Figure 6:
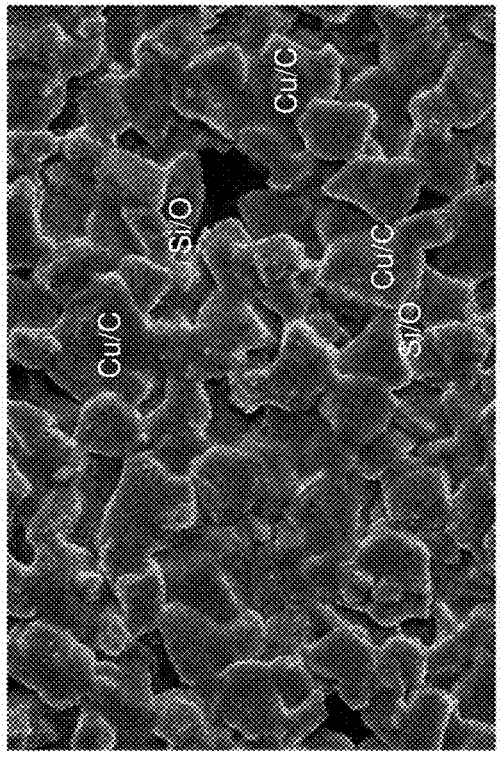
Figure 7:
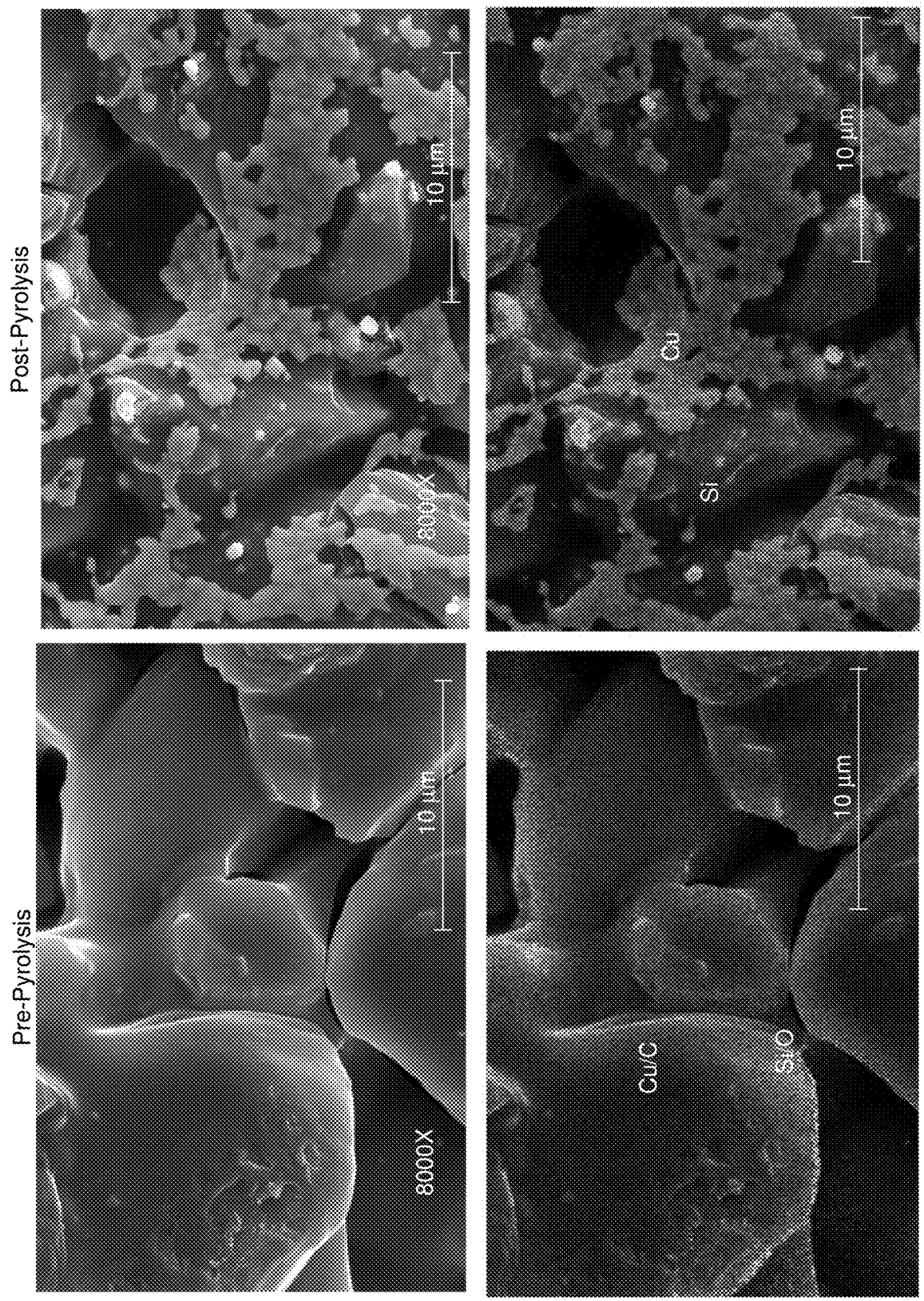
FIG. 7 shows higher magnification scanning electron microscope images of copper-coated silicon-dominant anodes, in accordance with an example embodiment of the disclosure.

At pyrolysis temperatures of 600-800 C, the metal may have thermally induced reactions with the active material and may form alloys, or may form smaller localized coatings on the silicon particles, as shown further with respect to FIGS. 6 and 7. The metal layer 305 may have a thickness of 50-150 nm, for example, when deposited, but may change in thickness during pyrolysis. One possible reaction is between carbon and copper forming a carbide material that may have beneficial characteristics, such as better conductivity and a protective capability. In one example, the thickness decreases during pyrolysis due to reactions with the active material layer. In another example, the thickness increases due to limited reactions with the active material layer and the coalescence of metal on the top surface of the silicon particles.

While FIG. 3 shows a one-sided anode, the active material layer may be deposited on both sides of the current collector 301, with a metal layer 305 on the outside surface of both active material layers.

Figure 4A:
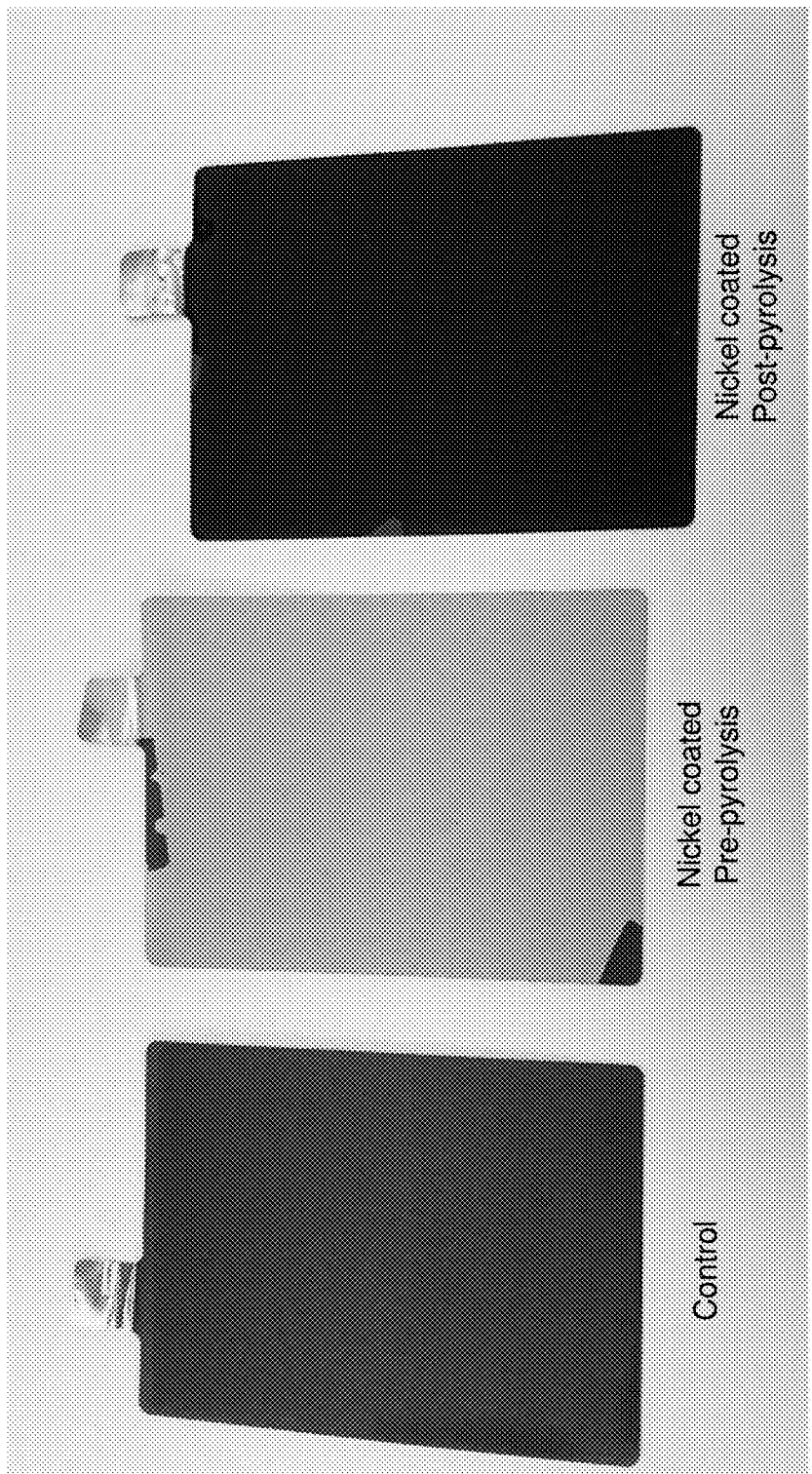
FIG. 4A illustrates a control anode and a nickel-coated anode, in accordance with an example embodiment of the disclosure.

FIG. 4A illustrates a control anode and a nickel-coated anode, in accordance with an example embodiment of the disclosure. Referring to FIG. 4A, there is shown a control silicon-dominant anode without metal coating, a nickel-coated silicon-dominant anode before pyrolysis, and a nickel-coated silicon-dominant anode after pyrolysis. The images illustrate how the pyrolysis process turns the metal coating black, indicating the possible presence of oxides and/or carbides. Four-point probe measurements of the anodes show resistivity of $2.4\text{-}4\times10^{-5}$ $\Omega$-cm for control anodes and $3\times10^{-2}$ $\Omega$-cm for nickel-coated anodes, indicating that the pyrolyzed nickel-coated surface has increased resistivity.

Figure 4B:
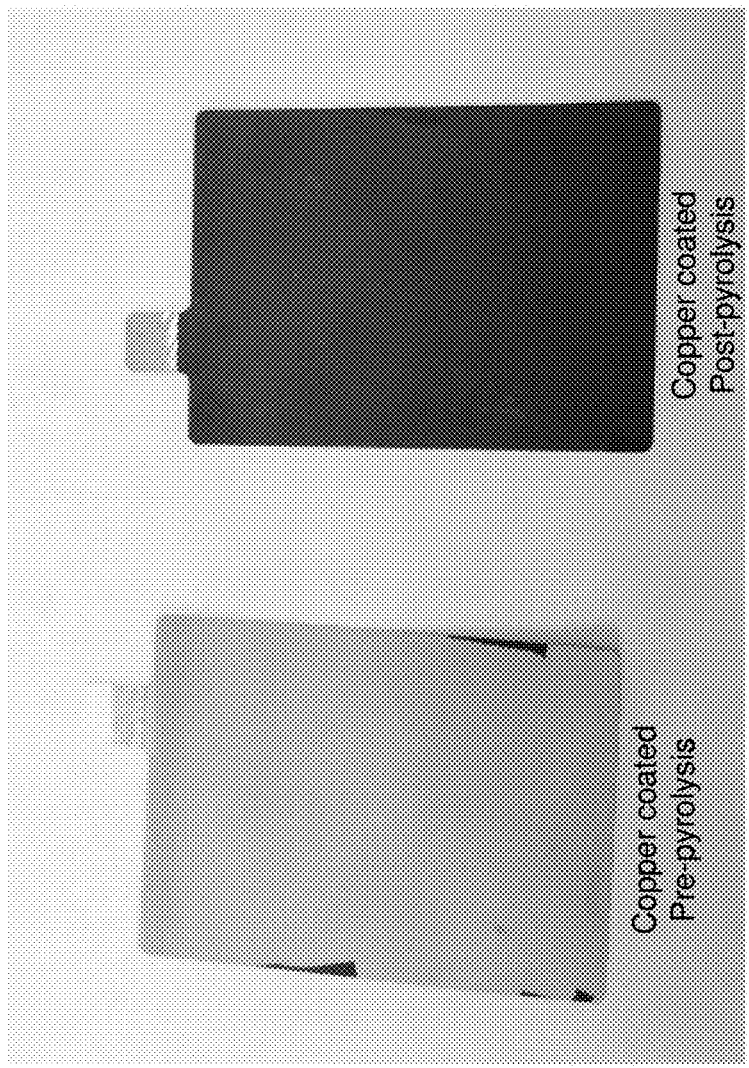
FIG. 4B illustrates a copper-coated anode, in accordance with an example embodiment of the disclosure.

FIG. 4B illustrates a copper-coated anode, in accordance with an example embodiment of the disclosure. Referring to FIG. 4B, there is shown a silicon-dominant anode having a copper current collector as well as a copper coating on the active material layer, the left image being prior to pyrolysis and the right image showing the anode after pyrolysis, again resulting in a black surface. Four-point probe measurements of copper-coated silicon-dominant anodes show resistivity of $\sim1\times10^{-5}$ $\Omega$-cm, and consistently $2\times10^{-5}$ $\Omega$-cm or less, as compared to $2.4\text{-}4\times10^{-5}$ $\Omega$-cm for control anodes, indicating that the pyrolyzed copper-coated surface has reduced resistivity, where reduced resistivity may improve life cycle and improve safety.

Figure 5:
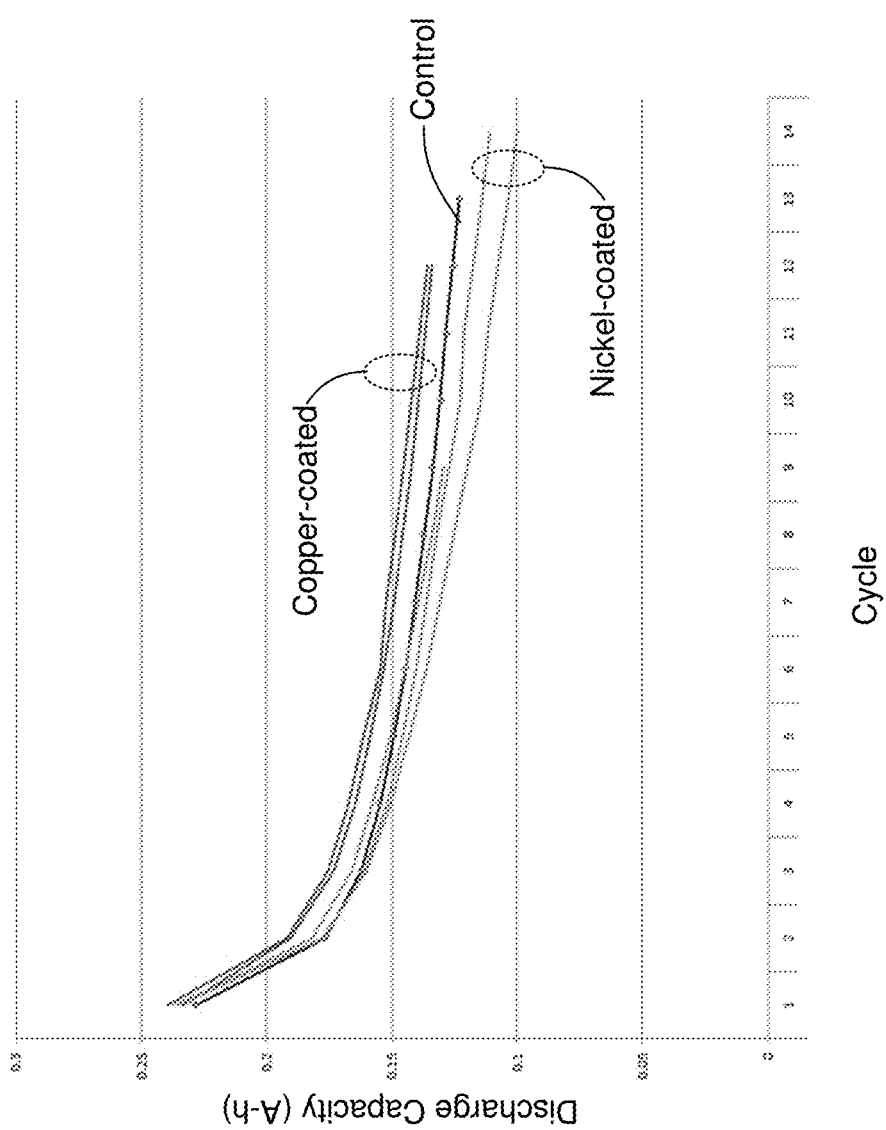
FIG. 5 illustrates discharge capacity versus cycle number for a control anode and copper-coated and nickel-coated anodes, in accordance with an example embodiment of the disclosure.

FIG. 5 illustrates discharge capacity versus cycle number for a control anode and copper-coated and nickel-coated anodes, in accordance with an example embodiment of the disclosure. The copper-coated silicon-dominant anodes had an initial coulombic efficiency of 0.8-0.82, while the control silicon-dominant anodes had initial coulombic efficiency of ~0.77. The nickel-coated silicon-dominant anodes had an initial coulombic efficiency of 0.75-0.77, about the same or slightly less than the control. Referring to the plot in FIG. 5, it can be seen that the copper-coated anode demonstrates higher charge capacity than the control anodes and the nickel-coated anodes, indicating the decreased resistivity (increased conductivity) of the copper-coated anodes improves cell performance.

FIG. 6 shows scanning electron microscope (SEM) images of copper-coated silicon-dominant anodes, in accordance with an example embodiment of the disclosure. Referring to FIG. 6, the left two images show the anode prior to pyrolysis, showing a smooth coating of metal on the silicon particles in the carbon matrix. The lower image shows energy dispersive x-ray analysis (EDAX) SEM results where copper and carbon coats the silicon relatively smoothly and where there is oxygen interspersed in the silicon signal, indicating $SiO_x$ on the surface.

The right two images show the anode following pyrolysis, where the copper coating is now scattered islands, or regions of copper, on the silicon particles. Also, the copper grain size increases due to pyrolysis. The EDAX SEM image on the lower right shows copper "islands" on the silicon particles with a lower concentration of carbon and oxygen visible. The copper regions may extend a few microns to tens of microns across, depending on the underlying silicon particle size and surface, and pyrolysis temperature. In some cases, the copper acts as a connective conductive web that can act as an electrical contact to several silicon particles or phases of the active material layer, where the phases may comprise local regions of silicon and pyrolyzed carbon. The copper islands connect/spreads across over several Si particles or active material phases, acting as bridges between the particles or phases, which enhances electrical connection in the carbon surrounding and improves the conductive matrix. Even if the copper is not a continuous sheet across the top of the active material layer, it does provide increased conductivity, decreased resistivity, as disclosed above.

FIG. 7 shows higher magnification SEM images of copper-coated silicon-dominant anodes, in accordance with an example embodiment of the disclosure. The left two images represent the copper-coated silicon-dominant anode before pyrolysis and the right two images represent the anode after pyrolysis. The upper left image shows the silicon particles covered with a smooth layer of copper. The lower left image shows EDAX SEM results with a high enough magnification that it is evident by the speckles that there are "particles" or small regions of copper and carbon on the silicon particles interspersed with oxygen on the silicon surface.

The close-up images show that while the metal layer after pyrolysis is not a continuous smooth layer, there is still a high density of copper on the surface providing a plurality of conductive paths on the surface, as further evidenced by the resistivity measurements described above. This increased conductivity may enable more electron capture by the current collector.

The copper islands may range from ~1 micron to tens of microns across, with grains of copper comprising the islands. The thickness of the copper islands may be similar to the original thickness of the metal layer, or may be increased as metal migrates and/or reacts during pyrolysis. The metal may be on the order of a few nanometers to tens of nanometers and up to hundreds of nanometers. For example, the thickness of the metal islands on the silicon particles may be 150 nm or less, 100 nm or less, 75 nm or less, or 50 nm or less.

In an example embodiment of the disclosure, a method and system is described for copper coated anode active material, and may include a metal current collector; an active material layer on the current collector, where the active material layer comprises at least 50% silicon by weight and a pyrolyzed carbon source; and a layer of metal on a surface of the active material layer that increases electrical conductivity of the active material layer. The surface may be opposite to a surface of the active material layer that is coupled to the current collector. The metal layer may comprise a conductive web in contact with multiple active material phases.

The layer of metal may comprise copper. The silicon may comprise particles ranging in size from 2 to 50 μm. The metal layer may comprise islands of metal on the silicon particles. The islands of metal may have a thickness of 100 nm or less. The islands of metal may be less than 50 μm across. A portion of the metal layer may comprise a metal silicide and/or a metal carbide. The carbon source may comprise polyimide and/or polyamide-imide. A conductivity of the anode active material layer and layer of metal may be less than $2\times10^{-5}$ Ω-cm.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, a battery, circuitry or a device is "operable" to perform a function whenever the battery, circuitry or device comprises the necessary hardware and code (if any is necessary) or other elements to perform the function, regardless of whether performance of the function is disabled or not enabled (e.g., by a user-configurable setting, factory trim, configuration, etc.).

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The invention claimed is:

1. A method of forming an anode of a battery, the method comprising:
   providing a metal current collector comprising a metal current collector first side;
   applying an active material slurry on the metal current collector first side;
   drying the active material slurry to form an active material layer comprising an active material layer first side and an active material layer second side opposite the active material layer first side, wherein the active material layer second side is on the metal current collector first side, and wherein the active material layer comprises a binder and at least 50% silicon by weight;
   after drying the active material slurry, depositing a metal layer on the active material layer first side; and
   subjecting the metal current collector, the active material layer, and the metal layer to a pyrolysis process that pyrolyzes at least a portion of the binder at a temperature of greater than 500° C.

2. The method of claim 1, wherein the metal layer comprises copper.

3. The method of claim 1, wherein the silicon comprises silicon particles ranging in size from 2 to 50 µm.

4. The method of claim 3, wherein the metal layer comprises islands of metal on the silicon particles.

5. The method of claim 4, wherein the islands of metal have a thickness of 100 nm or less.

6. The method of claim 4, wherein the islands of metal are less than 50 µm across.

7. The method of claim 1, wherein the subjecting the metal current collector, the active material layer, and the metal layer to the pyrolysis process alloys a portion of the metal layer with a portion of the active material layer to form a metal silicide.

8. The method of claim 1, wherein the subjecting the metal current collector, the active material layer, and the metal layer to the pyrolysis process alloys a portion of the metal layer with a portion of the active material layer to form a metal carbide.

9. The method of claim 1, wherein the metal layer comprises a conductive web in contact with multiple active material phases.

10. The method of claim 1, wherein a conductivity of the anode is less than $2 \times 10^{-5}$ Ω-cm.

11. A method of forming an anode of a battery, the method comprising:
    forming an active material layer of the anode on a metal current collector of the anode, wherein the active material layer comprises a binder and at least 50% silicon by weight, wherein first portions of the binder and the at least 50% silicon by weight define an active material layer bottom side of the active material layer contacting a collector top side of the metal current collector, and wherein second portions of the binder and the at least 50% silicon by weight define an active material layer top side of the active material layer opposite the active material layer bottom side;
    after forming the active material layer, depositing a metal layer of the anode on the second portions of the binder and the at least 50% silicon by weight that define the active material layer top side; and
    pyrolyzing at least a portion of the binder by heating the active material layer to a temperature of greater than 500° C.

12. The method of claim 11, wherein forming the active material layer comprises:
    applying an active material slurry on the collector top side; and
    drying the active material slurry to form the active material layer on the collector top side.

13. The method of claim 12, wherein the active material slurry comprises silicon particles ranging in size from 2 to 50 µm.

14. The method of claim 11, wherein the metal layer comprises copper.

15. The method of claim 11, wherein a conductivity of the anode is less than $2 \times 10^{-5}$ Ω-cm.

16. The method of claim 11, further comprising subjecting the metal current collector, the active material layer, and the metal layer to a pyrolysis process that pyrolyzes at least a portion of the binder.

17. The method of claim 16, wherein the subjecting the metal current collector, the active material layer, and the metal layer to the pyrolysis process alloys a portion of the metal layer with a portion of the active material layer to form a metal silicide.

18. The method of claim 16, wherein the subjecting the metal current collector, the active material layer, and the metal layer to the pyrolysis process alloys a portion of the metal layer with a portion of the active material layer to form a metal carbide.

19. The method of claim 16, wherein the subjecting the metal current collector, the active material layer, and the metal layer to the pyrolysis process causes the metal layer to form a conductive web in contact with multiple active material phases.

20. The method of claim 16, wherein the subjecting the metal current collector, the active material layer, and the metal layer to the pyrolysis process causes the metal layer to form islands of metal on silicon particles of the active material layer.

21. The method of claim 20, wherein the islands of metal have a thickness of 100 nm or less.

22. The method of claim 20, wherein the islands of metal are less than 50 µm across.

* * * * *